United States Patent
Kienzler et al.

(10) Patent No.: US 10,877,133 B2
(45) Date of Patent: Dec. 29, 2020

(54) OPTOELECTRONIC SENSOR AND METHOD OF MEASURING THE DISTANCE FROM AN OBJECT

(71) Applicant: SICK AG, Waldkirch (DE)

(72) Inventors: Stefan Kienzler, Waldkirch (DE); Martin Köhl, Waldkirch (DE); Kai Waslowski, Waldkirch (DE); Ulrich Zwölfer, Waldkirch (DE); Christophe Thil, Waldkirch (DE)

(73) Assignee: SICK AG, Waldkirch (DE)

( * ) Notice: Subject to any disclaimer, the term of this patent is extended or adjusted under 35 U.S.C. 154(b) by 399 days.

(21) Appl. No.: 16/013,582

(22) Filed: Jun. 20, 2018

(65) Prior Publication Data

US 2018/0372851 A1 Dec. 27, 2018

(30) Foreign Application Priority Data

Jun. 21, 2017 (DE) .................. 10 2017 113 675

(51) Int. Cl.
*G01S 7/00* (2006.01)
*G01S 7/4865* (2020.01)
(Continued)

(52) U.S. Cl.
CPC .......... *G01S 7/4865* (2013.01); *G01S 7/4861* (2013.01); *G01S 7/4873* (2013.01); *G01S 7/4876* (2013.01);
(Continued)

(58) Field of Classification Search
USPC ................................. 356/4.01, 5.01
See application file for complete search history.

(56) References Cited

U.S. PATENT DOCUMENTS 10,401,482 B2 * 9/2019 Kienzler ............... G01S 7/4865
10,637,485 B2 * 4/2020 Ronchini Ximenes ......................
H03L 7/0995
(Continued)

FOREIGN PATENT DOCUMENTS

DE 10 2007 013 714 A1 10/2008
EP 3418767 A1 * 12/2018 ........... G01S 7/4876

OTHER PUBLICATIONS

European Search Opinion for EP 3418767 (dated 2019).*
(Continued)

*Primary Examiner* — James R Hulka
(74) *Attorney, Agent, or Firm* — Nath, Goldberg & Meyer; Jerald L. Meyer

(57) ABSTRACT

An optoelectronic sensor is provided for measuring the distance from an object in a monitored zone that has a light transmitter for transmitting individual light signals into the monitored zone; a light receiver having at least one avalanche photodiode operated in Geiger mode for receiving the individual light pulses reflected or remitted by the object; an individual time of flight measurement unit for determining an individual time of flight of an individual light pulse as a duration between a transmitted point in time of the respective individual light pulse and its received point in time at the avalanche photodiode; and an evaluation unit that is configured to determine a common measured value for the distance from a plurality of individual times of flight and to estimate how many individual times of flight are to be expected in a time interval on the basis of background events.

16 Claims, 2 Drawing Sheets

Figure 1:
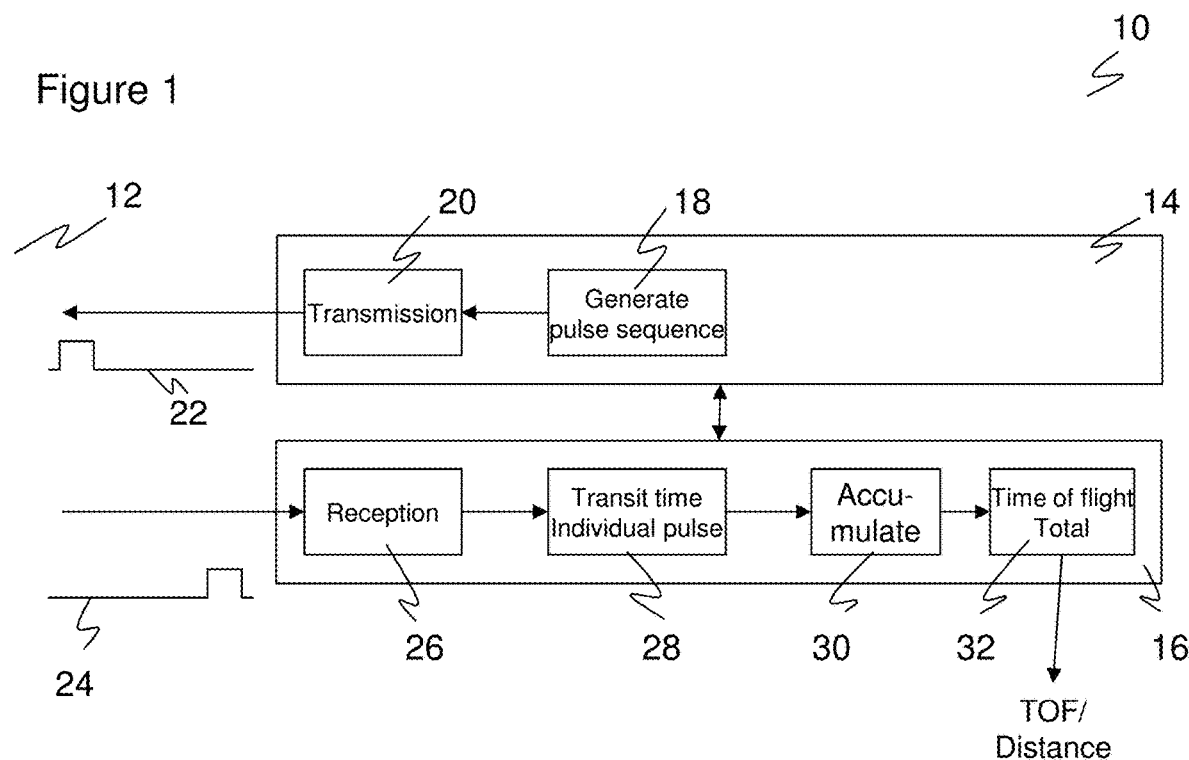

(51) Int. Cl.
*G01S 17/89* (2020.01)
*G01S 7/487* (2006.01)
*G01S 17/10* (2020.01)
*G01S 7/4861* (2020.01)
*G01S 17/42* (2006.01)

(52) U.S. Cl.
CPC .............. *G01S 17/10* (2013.01); *G01S 17/42* (2013.01); *G01S 17/89* (2013.01)

(56) References Cited

U.S. PATENT DOCUMENTS

| | | | | |
|---|---|---|---|---|
| 2012/0075615 A1* | 3/2012 | Niclass | ................... | G01S 17/10 356/5.01 |
| 2012/0162632 A1* | 6/2012 | Dutton | ................... | G01S 7/487 356/5.01 |
| 2013/0300838 A1* | 11/2013 | Borowski | ............. | G01S 7/4865 348/46 |
| 2014/0380112 A1* | 12/2014 | Pak | ......................... | H04L 47/27 714/748 |
| 2016/0033644 A1 | 2/2016 | Moore | | |
| 2017/0184709 A1* | 6/2017 | Kienzler | ................. | G01S 7/487 |
| 2018/0372849 A1* | 12/2018 | Kienzler | ................. | G01S 17/10 |
| 2019/0305784 A1* | 10/2019 | Ronchini Ximenes | ...................... | G01S 7/4865 |

OTHER PUBLICATIONS

Office Action dated Mar. 14, 2018 issued in corresponding German Application No. 10 2017 113 675.4.
Milstein, et al., "Acquisition algorithm for direct-detection ladars with Geiger-mode avalanche photodiodes", Applied Optics, vol. 47, No. 2, pp. 296-311, Jan. 2008.
Beer, et al., "Dead Time Effects in the Indirect Time-of-Flight Measurement with SPADS", I978-1-4673-6853-7/17 EEE, 2017.

* cited by examiner

OPTOELECTRONIC SENSOR AND METHOD OF MEASURING THE DISTANCE FROM AN OBJECT

The invention relates to an optoelectronic sensor for measuring the distance from an object in a monitored zone that has a light transmitter for transmitting individual light signals into the monitored zone; a light receiver having at least one avalanche photodiode operated in Geiger mode for receiving the individual light pulses reflected or remitted by the object; an individual time of flight measurement unit for determining an individual time of flight of an individual light pulse as a duration between a transmitted point in time of the respective individual light pulse and its received point in time at the avalanche photodiode; and an evaluation unit that is configured to determine a common measured value for the distance from a plurality of individual times of flight. The invention further relates to a method of determining the distance from an object in a monitored zone in which individual light pulses are transmitted into the monitored zone; the individual light pulses reflected or remitted by the object are received again by at least one avalanche photodiode of a light receiver operated in a Geiger mode; individual times of flight are measured as a duration between a transmitted point in time of an individual light pulse and its received point in time at the avalanche photodiode; and a common measured value for the distance is determined from a plurality of individual times of flight.

In a distance-measuring optoelectronic sensor, a distance from an object is determined beyond the pure object detection. Three-dimensional images or so-called depth maps are also detected with the aid of the distance information if the sensor is spatially resolving. A scanner scans the monitored zone with a light beam for this purpose, while a 3D camera also determines a piece of distance information for each of its pixels instead of or in addition to the brightness information. In this respect, the pixels can also respectively have a plurality of light sensitive elements that together contribute to a distance value.

A conventional method of distance measurement is the time of flight measurement. In this respect, a brief light pulse is transmitted and the time up to the reception of a remission or reflection of the light pulse is measured. It is, for example, known from DE 10 2007 013 714 A1 in order to acquire higher robustness with respect to interference events and noise effects to transmit a plurality of individual light pulses sequentially, to collect the received signals thereupon generated in a histogram, and to subsequently evaluate them together, for instance via a search for a maximum in the histogram from which the received point in time is derived.

Such histogram evaluations require a large amount of memory since the total time of flight to be expected in the measurement range is divided into bins whose widths are at least close to the desired measurement resolution. If the distance measurement should be spatially resolving, as in a 3D camera, this memory requirement also scales with the number of pixels or the detection time very considerably increases to avoid the increased memory requirement by a sequential processing of the pixels. This is in particular an obstacle for the development of inexpensive integrated evaluation modules, for instance in the form of an ASIC (application specific integrated circuit). The large number of memory cells in the explained counting process via histograms determines the area and also limits the speed.

The detection sensitivity of simple photodiodes is not sufficient in a number of application cases. In an avalanche photodiode (APD), the incident light triggers a controlled avalanche effect. The charge carriers generated by incident photons are thus multiplied and a photocurrent is produced that is proportional to the received light intensity, but that is in this respect substantially larger than with a simple PIN diode. In the so-called Geiger mode, the avalanche photodiode is biased above the avalanche voltage such that a single charge carrier released by a single photon can already trigger an avalanche that then recruits all the available charger carriers due to the high field strength. The avalanche photodiode thus, like the eponymous Geiger counter, counts individual events. Geiger-mode avalanche photodiodes are also called SPADs (single photon avalanche diodes).

The high sensitivity of the SPADs also brings along disadvantages since a single interfering photon or internal noise event already delivers the same signal as a pronounced wanted signal in a borderline case. In addition, the SPAD is subsequently not addressable for a specific dead time, with this dead time having the factual meaning over the short time scales that a SPAD is only available again on a measurement repeat. The conventional methods of time of flight measurement do not consider these special features of SPADs. They can admittedly therefore be transferred to SPAD light receivers, but improvement potential by SPADs remains unused in this respect.

It is therefore the object of the invention to improve the time of flight measurement with a SPAD light receiver.

This object is satisfied by an optoelectronic sensor and by a method of measuring the distance from an object in a monitored zone in accordance with the respective independent claim. Individual light pulses are transmitted by a light transmitter, are received again after reflection or remission at an object in a light receiver, and the individual time of flight is determined. The light receiver has at least one avalanche photodiode operated in Geiger mode or a SPAD. To obtain a reliable measured distance value, a plurality of single times of flight are measured and a common measured value is determined therefrom. The statistics are acquired over time and/or location, that is by measurement repeats using a plurality of sequential individual light pulses or in that the light receiver has a plurality of avalanche photodiodes in Geiger mode.

The invention now starts from the basic idea of taking account of the special statistical behavior of SPADs in the distinguishing of measurement events and background events. In this respect, measurement incidents are caused by photons of the individual light pulse, whereas background events are all the other triggers of an avalanche such as dark noise or extraneous light reception. On the estimation of how many individual times of flight fall into a time interval due to background events, an exponential decay of the still available avalanche photodiodes is assumed. The other avalanche photodiodes are then in their dead times in which they have not yet sufficiently recovered from an avalanche. The received point in time sought for the common measured value is disposed in a time interval having significantly more individual times of flight than to be expected by background events. The common measured value is thus first determined with a measurement resolution that corresponds to the width of the time interval. The measurement resolution can be improved in further evaluation steps.

The invention has the advantage that the time interval in which the sought measurement event is disposed is localized very accurately and coordinated with the actual extraneous light conditions. Conventionally, static thresholds are used for this purpose that are placed correspondingly conservatively and therefore result in considerable losses in sensitivity and range. The robustness of the measurement is not only increased with respect to extraneous light, but rather also with respect to sensor properties subject to other fluctuations in production and operation of the sensor such as the aperture, the intensity of the light transmitter and thus of the individual light pulses. Switching sensors correspondingly have a reduced proneness to erroneous switching.

It is possible to resolve a plurality of partly transparent objects arranged behind one another, for instance an object behind a glass pane, provided that its distance is greater than the observed time interval. It is also prevented that distance values are falsified in the case of a plurality of partly transparent objects or of a plurality of partly illuminated objects such as edges of an object when photons of both the object in the foreground and of an object disposed behind it are incident on the light receiver.

The integration is furthermore simplified in an ASIC, for example, and less area is taken up there. In addition to considerably reduced memory demands, essential parameters for the characterization of the background and of the received point in time can also be determined sequentially and therefore efficiently and accurately.

The evaluation unit is preferably configured to divide a measurement period following the transmission of an individual light pulse into time intervals. These time intervals can be understood as bins of a histogram. They are preferably each of equal length to simplify the modeling and the calculation. In accordance with the invention, that time interval is localized in which a measurement event must lie because significantly more individual times of flight are disposed there than to be statistically expected on the basis of background events. With partly transparent objects or with measurement events at the margin of a bin, there can also be a plurality of such time intervals.

The duration of the time intervals or the bin width is a parameter that makes it possible to find a balance between the accuracy of the measurement and the effort and/or cost, In addition to the memory effort and calculation effort, the bandwidth must also be observed that is required for the transmission of individual times of flight for the further evaluation. The method in accordance with the invention can be applied prior to such a transmission and then make possible a substantial data compression in dependence on the setting of the bin width. As already mentioned, it is possible to determine the received point in time within the localized time interval more accurately downstream. More time is available for this downstream fine evaluation due to the fast localization of relevant regions with the same total calculation power so that a very good total performance can be achieved. Alternatively, very high measurement rates result with a fast evaluation.

The evaluation unit is preferably configured to estimate the expected number of individual times of flight in a time interval using a Bernoulli model into which the maximum number of possible individual times of flight in the time interval and a background probability are entered such that an individual time of flight is disposed in the time interval due to a background event. Depending on the start of the observed time interval with respect to the transmission point in time, a certain proportion of avalanche photodiodes is no longer available. The remaining avalanche photodiodes become active in the time interval with a certain probability solely due to background events. The avalanche photodiodes still available in total and said probability are the parameters of the Bernoulli model. The expected value can be calculated directly as their product. Consequently, so many individual times of flight are to be expected in accordance with the Bernoulli model due to background events in the time interval.

The evaluation unit is preferably configured also to calculate a standard deviation from the Bernoulli model and thus to evaluate whether there are significantly more individual times of flight in a time interval than expected. To avoid a square root calculation, work can also be carried out with the variance that is understood in this connection as the same as the standard deviation. The calculation of the standard deviation is very simply possible using the two parameters named in the previous paragraph. A robust criterion for significant deviations from the expectation as a multiple of the standard deviation is also possible from this. This criterion is dynamically and locally adapted to the time interval and therefore makes possible a particularly sensitive and simultaneously robust measurement.

The evaluation unit is preferably configured to evaluate whether significantly more individual times of flight are present in a time interval than expected by a comparison of the number of measured individual times of flight in a time interval with the number of individual times of flight in a time interval expected from the Bernoulli model. In this respect, the number of measured individual times of flight in a time interval corresponds to the trigger probability measured for this time interval and the expected number of individual times of flight in a time interval corresponds to the trigger possibility for the background derived from the Bernoulli model. The significance of the deviation is evaluated directly on the basis of events in this embodiment. This is a little less accurate than with a standard deviation or with a variance, but the calculation effort for this is also less.

The evaluation preferably has a hysteresis that requires greater significance when significantly more individual times of flight were not previously found in a time interval and significantly more individual times of flight should now be found than for the opposite case. This can best be understood for the example of a switching sensor that switches over on a presence of an object in a specific distance range. A larger multiple of the standard deviation or a greater difference between measured events and expected events in a time interval is then required for the transition from OFF to ON than for the opposite process.

The evaluation unit is preferably configured to evaluate at least two adjacent time intervals together for a taking into account of objects at a distance close to the border of the time interval. The measurement events are also subject to a certain variation and can therefore contribute randomly in adjacent time intervals. The measurement becomes more robust if this case is taken into account.

The evaluation unit is preferably configured to transmit individual light pulses with a delay to exclude their reception for an initial phase and thus to estimate how many individual times of flight are to be expected on the basis of background events in a time interval. The exponentially decaying frequency that is assumed for background events is thus parameterized by measurement. The delay ensures that there are only background events in an initial time period of the measurement period. This could also be ensured in that provision is made for a minimum distance of all the objects in a near zone in front of the sensor. A further alternative is a background measurement with an inactive light transmitter.

The evaluation unit is preferably configured to determine parameters for describing the exponentially decaying frequency of background events for a plurality of time intervals, to determine a quantile of these parameters, in particular the median, and to base the further estimation of the frequency of background events on the parameter corresponding to this quantile. This procedure has the advantage that the background is estimated without any special measures with which the measurement events are excluded. There are therefore no additional measurements or time periods kept free of measurement events.

For this purpose, at least one parameter is determined for the characterization of the background in a plurality of bins, or even in all the bins, or time intervals of a measurement period. The time constant of the exponential decay or a value corresponding to it is suitable for the characterization. The parameter also directly determines the background probability for the Bernoulli model. The parameters are partly substantially falsified for bins with measurement events. However, under the condition that the light spot of the individual light pulse can only be incident on some of the avalanche photodiodes, measurement events never relate to all the avalanche photodiodes. The parameters falsified by measurement results can therefore be excluded by order statistics, namely cut-off at a quantile and in particular the median. It must be ensured in this respect that time intervals at whose end, for example with extraneous light that is too high or with very high signal intensity, the number of available avalanche photodiodes is too small, are not considered in the evaluation.

The parameters in a time interval are preferably determined from a quotient of the measured individual times of flight in the time interval to the maximum number of possible individual times of flight in the time interval. The ratio of triggering avalanche photodiodes to still available avalanche photodiodes is constant in each time interval without measurement events with an ideal background behavior due to properties of the exponential function. Time intervals with measurement events are excluded by the quantile or by the median and the error with respect to an individual measurement is simultaneously considerably reduced. This is therefore a simple and robust procedure to estimate the time constant or a parameter equivalent thereto.

The light receiver preferably has a plurality of avalanche photodiodes operated in Geiger mode and a plurality of individual time of flight measurement units (also known as time of flight of light measurement units) that are associated with the avalanche photodiodes individually or group-wise. The avalanche photodiodes are here preferably arranged in linear form or in matrix form. There are then various variants of interconnection. The avalanche photodiodes can deliver a common measured value overall. It is, however, also possible to obtain a spatial resolution in that a plurality of avalanche photodiodes each determine a respective measured value as a group. This then produces a 3D image sensor whose effective spatial resolution corresponds to the number of groups, with the group size enabling an exchange relationship of spatial resolution, accuracy, and measurement time of the distance determination. In this respect, individual times of flight are selectively measured for each avalanche photodiode or only together for a plurality of avalanche photodiodes. The individual time of flight measurement units can be fixedly or variably associated with specific avalanche photodiodes.

The individual time of flight measurement units preferably have a TDC (time-to-digital converter). It is a known and relatively simple component that can determine individual times of flight with a high temporal resolution. The TDC is preferably started at the transmitted point in time and is stopped by the received light pulse at the received point in time.

The evaluation unit is preferably configured to determine a mean value of the individual times of flight in the respective time interval for at least some time intervals. This mean value can be used for an improvement of the measurement resolution in subsequent evaluation steps.

The evaluation unit is preferably configured to determine the common measured value with increasingly finer resolution recursively by refining time intervals in which there are significantly more individual times of flight than expected. The measurement resolution is restricted in the first step to the width of the time interval due to the localization in accordance with the invention of a time interval with the measurement event. The measurement resolution can be recursively improved in that the process is only repeated in the local environment of the previous common measured value. Only a smaller time range thereby has to be evaluated and it is used to work conversely with finer time intervals, whereby the measurement result successively increases. The recursion can, for example, be aborted after a predefined number of steps or measurements or on reaching a desired measurement resolution.

The method in accordance with the invention can be further developed in a similar manner and shows similar advantages in so doing. Such advantageous features are described in an exemplary, but not exclusive manner in the subordinate claims dependent on the independent claims.

Figure 2:
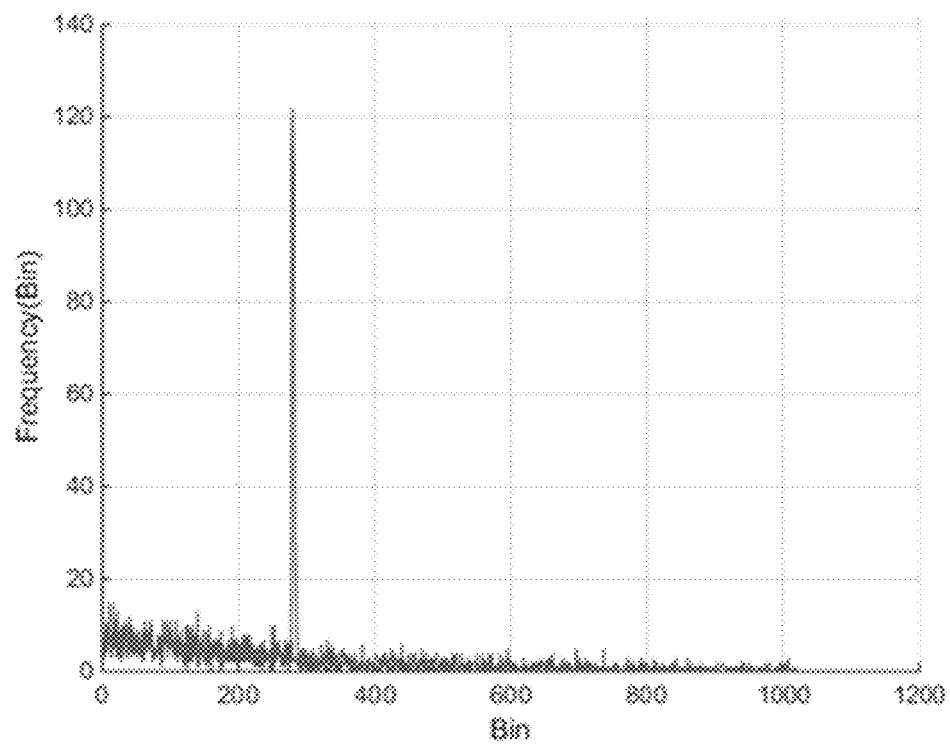
Figure 3:
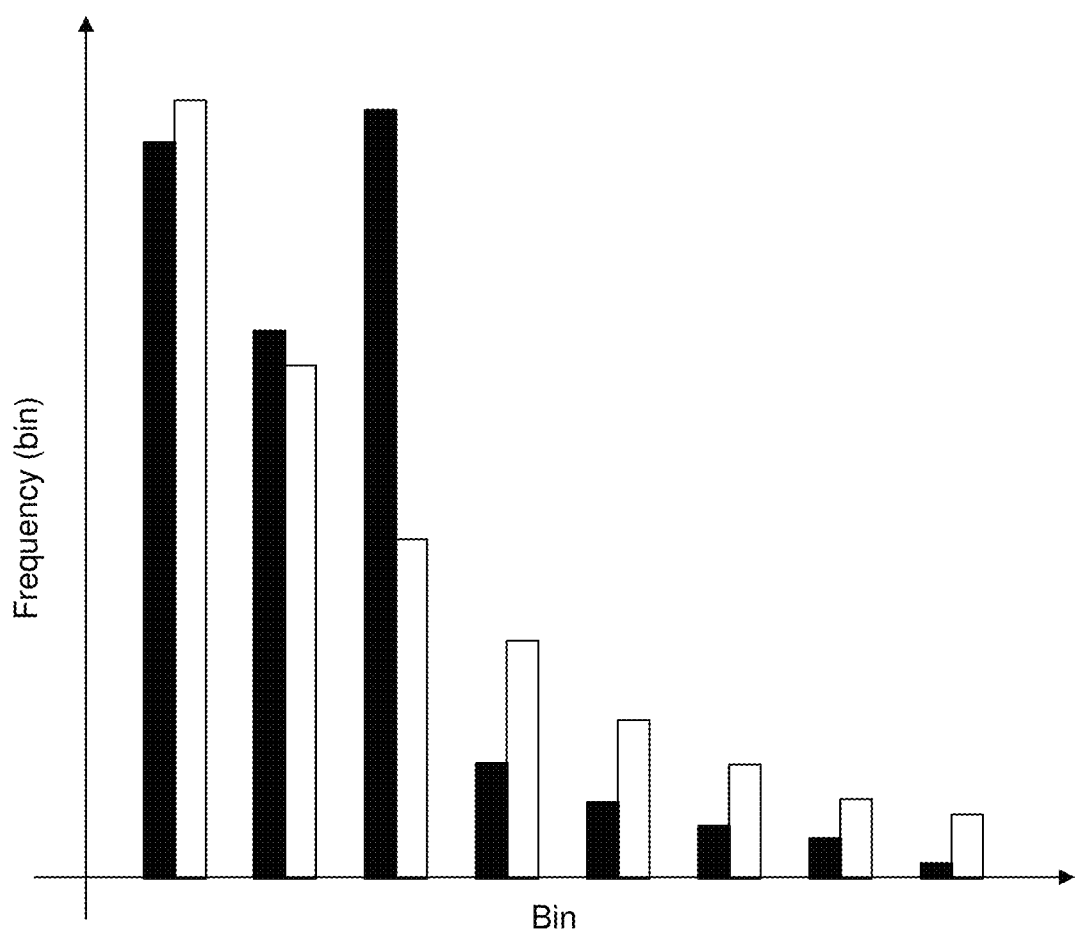

The invention will be explained in more detail in the following also with respect to further features and advantages by way of example with reference to embodiments and to the enclosed drawing. The Figures of the drawing show in:

FIG. 1 a block diagram of a measurement core for determining the time of flight from a sequence of individual light pulses;

FIG. 2 an exemplary histogram of a plurality of times of flight measured with individual pulses; and FIG. 3 an exemplary histogram of the distribution of the individual times of flight on a measurement (black) in comparison with an expected distribution of background events (white).

FIG. 1 shows a simplified block diagram of a sensor 10 for determining the distance from an object in a monitored zone 12 by measuring times of flight. The sensor 10 is divided into an upper transmission path 14 and a lower reception path 16 in FIG. 1. This division is not intended to imply any technical properties. The invention primarily relates to the reception path 16 so that any known implementation is conceivable for the transmission path 14. The elements of the transmission path 14 can be separate modules, but can also be integrated on a common module with the elements of the reception path 16.

Short individual pulses are generated in the transmission path 14 by a pulse generator 18. The pulse shapes, pulse breaks, and pulse lengths can here be varied, for example for a coding or for an adaptation to environmental conditions. However, for the interests of the invention, the simpler idea of a uniform sequence of individual pulses is sufficient that have a sufficient temporal spacing from one another so that the measurements do not influence one another. A light transmitter 20, for example an LED or a laser diode, generates corresponding individual light pulses 22 from the electronic transmitted signal that are transmitted into the monitored zone 12. If the individual light pulses 22 are incident on an object there, a corresponding reflected or remitted individual light pulse 24 returns to the sensor 10 and is incident on a light receiver 26 that generates an electronic received signal from it.

The light receiver 26 has avalanche photodiodes, not shown, in particular a large number of avalanche photodiodes in a linear or matrix arrangement. In this respect, a spatial resolution can be maintained and thus a 3D image sensor can arise, with a reduced spatial resolution being achievable with a more precise distance measurement by a common evaluation of a plurality of avalanche photodiodes. In an extreme case, all the avalanche photodiode elements are used for the determination of a common measured value. The avalanche photodiodes are operated, as already briefly described in the introduction, in Geiger model and are also called SPADs. The avalanche photodiodes or APDs are biased above their avalanche voltage and the avalanche flow can already be triggered by a single photon. SPADs are therefore extremely sensitive, but are at the same time also prone to incorrect measurements since a time of flight determined by a SPAD can be erroneously based on dark noise or on the registration of an extraneous light photon and can then be fully non-correlated with the spacing of the object. In addition, an avalanche photodiode is no longer available for a dead time after an avalanche. The statistical approach in accordance with the invention for evaluating a plurality of individual events with a characterization and distinguishing of background events is adapted to these properties of the SPADs.

As a first evaluation step, an individual time of flight measurement unit 28 determines the respective individual time of flight between the transmission of an individual light pulse 22 and the reception of the associated remitted individual light pulse 24. A plurality of individual time of flight measurement units 28 can be provided that are fixedly or dynamically associated with specific avalanche photodiodes or with groups thereof. For example, a block of TDCs (time-to-digital converters) is provided for this purpose, with the respective TDC being started on the transmission of an individual light pulse and being stopped by a signal generated by the avalanche in an associated avalanche photodiode. The mode of operation of the TDCs is not fixed; for example, a different possible mode of operation is the so-called common stop mode in which the signal of the avalanche photodiode starts the respective TDC and all the TDCs are stopped together, for example at the end of a measurement period.

Further evaluation steps are only shown rudimentarily in FIG. 1 and will only be described more precisely further below with reference to FIG. 3. Very roughly, the individual times of flight are first collected in a memory 30. This can already be done in a combined manner, for example in a histogram having a bin width that is selected while taking account of the desired resolution and of the memory requirement; or certain statistical values such as the mean value, the mean value per bin, or the number of individual times of flight and the like are directly continuously formed. The individual times of flight are then evaluated together in a measured value block 32 to ultimately acquire the distance from the object.

At least the reception path 16 is integrated on an ASIC in a preferred embodiment. In this respect, separate blocks can be provided for the light receiver 26, on the one hand, and for the evaluation circuits 28, 30, 32, on the other hand. However, at least respective individual time of flight measurement units 28 are preferably arranged directly at the light receiver 26 and form intelligent pixels with individual avalanche photodiodes or with groups thereof. The accumulator 30 and the measured value block 32 can also be integrated into these pixels. A higher ranking control then decides whether and how the measurement results of the pixels are used in a spatially resolved manner or are averaged again. In a further embodiment, an FPGA (field programmable gate array) is used on which the accumulator 30 and/or the measured value block 32, and optionally also the individual time of flight measurement unit 28, is/are implemented.

FIG. 1 only shows the components of the optoelectronic sensor 10 relevant to the actual measurement. Further elements required in practice and known per se such as a transmission or reception optics have been omitted for reasons of a better overview. The sensor 10 can be a simple sensing device that measures the object distance on an axis and then, for example, outputs a continuous numerical value for the distance or the sensor 10 acts as a switch whose switching state changes depending on the presence or absence of an object in a predefinable distance range. The axis of the sensing device can be set into a rotary movement by a corresponding rotating mirror or as a measurement body rotating in total and then forms a scanner. A further exemplary embodiment of the sensor 10 is a 3D camera.

FIG. 2 shows an exemplary histogram of a plurality of individual times of flight for illustration. In this respect, the bins on the X axis are time intervals of possible times of flight, here in any desired units and in high resolution, i.e. with a small bin width. The Y axis represents the associated number of detected individual times of flight. The histogram is therefore a distribution of the measured individual times of flight overall.

The histogram in this case shows a clear maximum that is recognized approximately in the 270th bin with the naked eye and that is clearly distinguished from the background of the individual times of flight caused by dark noise, extraneous light, and other interference effects. The maximum could be found using a threshold evaluation and the distance of the object could be determined therefrom. However, this requires considerable memory requirements for the high resolution histogram, particularly when it is imagined that such a histogram would have to be stored for every pixel in a 3D image sensor. In addition, the situation in FIG. 2 is very simple in that the maximum stands out very clearly from the background. This is in particular by no means the case in a real measurement, in particular with low-remitting objects or with objects that are far away.

In accordance with the invention, a special evaluation therefore takes place that characterizes the background while taking account of the special properties of SPADs and that localizes the measurement event using significant deviations from this background. This is preferably also not done on the full, high resolution histogram in order to be able to carry out the evaluation with considerably fewer resources such as memory, computing power, and band width for data transmission. The measured value is then initially only determined with a resolution corresponding to the larger bin width. A further measurement and/or evaluation can optionally then only follow in the local environment of the measured value to improve the resolution. For example, the method in accordance with the invention can be used recursively, with the region found in step k representing the total region of the (k+1)th measurement, optionally increased by a safety buffer.

FIG. 3 shows an exemplary histogram that is not stored in its full resolution, but only in a rough division of the measurement period into $N_S$ time intervals or bins. In this example, they are $N_S=8$ disjunctive equidistant time ranges from $t_i$ to $t_{i+1}$. At least the number of individual times of flight or events $N_{i+1}$, $0 \leq i < N_S$ that fall into the bin and thus into the time interval $t_i$ to $t_{i+1}$ are stored for each bin. This number is also the parameter entered on the Y axis in FIG. 3, with black bars showing an exemplary measurement with an object and white bars showing for comparison a measurement without an object or individual light pulses 22 transmitted by the light transmitter 20, that is the background. It is possible to determine and store further values with respect to the bins, for example the mean value $m_{i+1}$ of the individual times of flight in a bin.

The histogram is produced from a number of $N_M$ measurements in which a respective individual light pulse 22 is transmitted and a remitted individual light pulse 24 is received, and indeed in $N_P$ avalanche photodiodes so that a pool of up to $N_0 = N_M N_P$ measurement events is available overall. The corresponding individual times of flight are associated with the bins and increase the number (frequency, count) there.

As easily recognizable in the example of FIG. 3, the measured signal increases the number in the associated bin, here the third bin. However, the absolute number is hardly higher than in the first bin to which the measured signal does not contribute at all. An absolute threshold would therefore not be a good means to localize the bin with the measurement signal. The expected background per bin is therefore estimated and taken into account in accordance with the invention. The evaluation consequently has to perform two main steps: A characterization of the background and a recognition of significant deviations from this expected background. The third bin can thereby be detected in the example of FIG. 3. A measured value for the distance of the detected object thus already results over the time boundaries of the bin. It is also conceivable to have a more accurate measurement or evaluation follow within the bin found.

An exponential decay such as the white bars in FIG. 3 show is required for the characterization of the background. To determine the parameters of the exponential decay, local models or measurements can be used with a switched off light transmitter 20 and will be explained in more detail below. The exponential decay is due to the fact that SPADs have a dead time after an avalanche and the population of respective available avalanche photodiodes is therefore correspondingly reduced for the remainder of the associated bin and the following bins. In this respect, a dead time can also have technical switch reasons, in addition to the physically inactive time for recovery after an avalanche, for instance a configuration of the time of flight measurement (TDC with store first event until reset).

If there is thus an expectation at the background, an increased number $N_i$ of individual times of flight can thus be recognized in a bin and can be quantified in the form of a parameter $S_i$. If $S_i$ exceeds a threshold $S_D$, that is preferably determined individually for the bins, an object is thus detected in the corresponding bin. There can also be a plurality of segments with $S_i \geq S_D$. This then corresponds to a multi-goal detection with edge impingements or semitransparent objects and only a subset is preferably then looked at further such as the largest $S_i$ that satisfies the condition $S_i \geq S_D$ ("strongest object signal") or the $S_i$ with the smallest index i that satisfies the condition $S_i \geq S_D$ ("closest object"). It is also possible that the maximum of the measured signal is close to or on a boundary of two bins and thus delivers contributions to both adjacent bins. Adjacent bins are therefore preferably also observed to ensure a stable evaluation and also a high accuracy for this case. This can already be taken into account in the calculation of the parameters $S_i$.

As can be seen in FIG. 3, the number of individual times of flight in the fourth bin following the maximum is greatly reduced and is considerably below the background. This is due to the fact that avalanche photodiodes that detect the maximum are then no longer available due to the already mentioned dead times. An exponential decay corresponding to the background adjoins via the further bins, but at the lower level. The bin with the maximum can consequently alternatively or additionally also be recognized as the predecessor to that bin, here the fourth bin, in which the number of times of flight abruptly decays below the background.

The two main steps of characterization of the background and recognition of significant deviations are thus roughly explained. The result is that a bin is recognized (ROI, region of interest) in which the received point in time falls. The time of flight is thus also determined as part of the resolution of the histogram by the time boundaries of the bin. A more accurate evaluation based on the information of the found bin and optionally of its neighbor can adjoin to determine the received point in time more exactly in a technical measurement manner or computation manner in an iterative or non-iterative process. For this purpose, the information $N_i$, $N_{i+1}$, $m_i$, and $m_{i+1}$ of the found bin and its neighbor can be used, for example. In a possible embodiment, the mean value $m_i$ of the found bin i can be used as the distance value, for example. The measured value block 32 or another evaluation circuit should therefore also be able to determine these mean values. It is also possible to continue or repeat the measurement, but now only to form the histogram in an environment of the previously measured distance and with a better resolution for that reason. Measurement repeats can follow the determination of a common measured value for the object distance to then form a mean value or median from n measured values.

The two main steps will be presented in detail in advantageous embodiments in the following.

Characterization of the Background

It is assumed due to dead times of SPADs that the background at least sectionally follows an exponential distribution. Its parameters should be determined from the individual times of flight and in particular from a histogram such as is shown by way of example in FIG. 3.

One approach comprises providing that at least some bins of the histogram are free of measurement events. A separate measurement with an inactive light transmitter 20 can be carried out for this purpose. All $N_S$ bins then only include information on the background. To avoid a separate measurement, it is also conceivable first to activate the light transmitter 20 with a certain delay with respect to the light receiver 26 so that it is then ensured that the first bins only detect background events. The same result can be achieved in that objects have to observe a defined minimum distance from the sensor 10; the delayed activation of the light transmitter 20 can then be omitted.

It is in this respect implicitly required that the avalanche photodiodes are respectively only activated for the measurement, for example in that a bias voltage is first applied above the avalanche voltage. Otherwise, a not insubstantial proportion of the avalanche photodiodes is already in the dead time phase at the start of the measurement. A measurement and also the method described here would thus still be possible, but the total pool $N_P$ of available avalanche photodiodes would be reduced and the sensor 10 would unnecessarily lose sensitivity.

It is admittedly conceptually particularly obvious to determine the background from bins that are only filled from background events. The background can, however, also be estimated from a histogram with measurement events, which has the advantage that no separate measurement time is required for the determination of the background. In addition, possible background fluctuations over short time scales lose effect because the determination of the background and the measurement are based on the same data.

In a corresponding embodiment for dynamic background estimation, background parameters for $N_B$ bins, $N_B \leq N_S$, are estimated, first irrespective of the fact that the background parameters from bins with measurement bins are per se unsuitable for this purpose. $N_S$ designates the number of all the bins. The selection of $N_B$ is the result of a weighing up between accuracy and computing effort of the background estimation. The exact selection of the $N_B$ bins is not critical: frequently, for example, every qth bin, $1 \leq q$, of the $N_S$ bins is selected or the first q bins.

Order statistics are used to characterize the background. A quantile can specifically be formed for the $N_B$ for parameters estimated for the background. If it is, for example, assumed that the proportion of the $N_B$ bins on which an individual light pulse 22 transmitted by the light transmitter 20 has an effect is smaller than $N_B/2$, the background can be determined by forming the median of all $N_S$ estimated values for the background. If it is expected that a specific proportion a of the $N_B$ regions are not only influenced by the background due to the presence of an object in the monitored zone 12, a different quantile than the median can also be selected, for example, the (50%-a/2) quantile, to compensate this proportion a. In this procedure, regions should preferably be excluded at whose temporal end sufficient avalanche photodiodes are no longer available for the local background estimation due to, for example, too strong a wanted signal or extraneous light.

The background without signal photons is described by an exponential distribution $$F(\text{Bin}) = N_0 \exp(-\text{decayBackground}*\text{Bin})$$

whose parameter $N_0 = N_M N_P$ is known from the start as a product of the number $N_M$ of transmitted individual light pulses 22 and the number $N_P$ of the individual times of flight that can be simultaneously determined with a plurality of avalanche photodiodes. The parameter decayBackground, that is the time constant of the exponential decay, is determined from factors such as the dark noise and the extraneous light and is determined from the histogram. It must be pointed out at this point that neither the temporal division of the bins has to be fixed, but can rather be adaptively adapted, and nor does the same distribution function has to be assumed globally over the total background. It is only decisive that the background is local, that is some fewer bin can be characterized by fewer parameters in the environment and these parameters can be determined in accordance with the above-described measurement scenarios.

It would be conceivable to estimate decayBackground directly and to work with it, but this has the disadvantage that complex logarithm calculations are necessary. Due to the exponential distribution, the relationship of avalanches triggered by background events and still available avalanche photodiodes per time is constant (scale freedom of the exponential function). This also applies in the respective bins to an equidistant temporal division, apart from noise and discretization artifacts. This relationship can be calculated with very little effort for every bin to characterize the exponential distribution locally and is therefore preferably used.

Therefore let $F_i$ be the number of avalanche photodiodes that were not yet active before the point in time $t_{i-1}$. This corresponds in a bin to the maximum possible measurement events $N_0$ less the accumulated numbers of the previous bins. The ratio that characterizes the exponential decay is then calculated for each bin:

$$p\text{Trigger}[\text{Bin}] = (\text{Number}[\text{Bin}] + \text{Regularization})/F_i[\text{Bin}].$$

To avoid divisions, a look-up table can be used in combination with a multiplication. The additional term "Regularization$\geq 0$" serves for the reduction of discretization artifacts. In practice, "Regularization=1" or a value in this order of magnitude can be selected.

As explained above, a histogram can be used that also includes measurement results. A quantile, in particular the median pTriggerMedian, is then preferably formed via the array pTrigger[Bin]. If only bins without measurement events are included, a different common measure such as the mean value can alternatively also be used and in principle every single pTrigger[Bin] is then already an estimated value for characterizing the background.

Recognition of Significant Differences from the Background

The basis for the evaluation of the differences from the background is the difference of the numbers of individual times of flight actually measured in a bin and expected on the basis of the background. This is immediately understandable in the example of FIG. 3 as the piece by which the black bars differ from the white bars. The observation can, however, also extend simultaneously over some adjacent bins. The comparison values of the background (white bars) can come from a reference measurement with an inactive light transmitter or they are estimated in accordance with the exponential distribution explained in the preceding section. Specifically, only pTriggerMedian*$F_i$[Bin] has to be calculated for this purpose.

The respective difference can be compared with an absolute threshold in a simple embodiment. A relative threshold that, for example, requires a certain proportion of $N_0$, $F_i$[Bin] (white bar) or Number[Bin] (black bar) is a little more accurate.

However a Bernoulli model preferably forms the basis of the evaluation. The light receiver 26 is understood as a statistical system to whose avalanche photodiodes a binary state is assigned, namely whether they have triggered an avalanche or not. The parameters n, p of the Bernoulli model are already known since $F_i$[Bin] avalanche photodiodes are still available in a bin overall and they each become active with the probability pTriggerMedian.

$$\text{expValue}(i) = p\text{TriggerMedian}*F_i[\text{Bin}];$$

$$\text{stdev}(i) = \text{sqrt}(F_i[\text{Bin}]*p\text{TriggerMedian}*(1-p\text{Trigger-Median}))$$

consequently applies to the mean value expValue and to the standard deviation stdev.

The square root of $F_i$[Bin] can be determined by means of a look-up table for an efficient calculation. The term sqrt (pTriggerMedian*(1−pTriggerMedian)) is independent of the respective bin and therefore only has to be calculated once.

A dynamically adapted, local threshold criterion is thus now present via the standard deviation. Only a statistical relevance sigmaPrefactor has to be specified, i.e. a multiple of the standard deviation corresponding to the desired significance. The local threshold is then at $S_i = \text{expValue}(i) + \text{sigmaPrefactor}*\text{stdev}(i)$. If no bin is found in which this threshold is exceeded, it is evaluated as an object free monitored zone 12.

This approach can be simplified to reduce the calculation effort: For example, the expected value and/or the standard deviation of the first bin can be used for all bins to determine the threshold so that $S_i$=expValue(i)+sigmaPrefactor*stdev(i=1), $S_i$=expValue(i=1)+sigmaPrefactor*stdev(i), or $S_i$=expValue(i=1)+sigmaPrefactor*stdev(i=1) result as possible thresholds $S_i$. The last case corresponds to a dynamically adapted threshold per measurement that is the same for all bins, however.

In an even further simplified embodiment, the calculation of the standard deviation is dispensed with and the threshold is only determined on the basis of the parameters expected value expValue(i) and trigger probability pTrigger[Bin] of the Bernoulli model and of the background trigger probability pTriggerMedian. Possible definitions for the significance in the framework of these simplifications would, for example be $S_i$=(pTrigger[Bin]−pTriggerMedian)/(pTriggerMedian+Regularization), which is equivalent by multiplication by $*F_i$[Bin] to $S_i$=(Number[Bin]−expValue(i))/(expValue(i)+Regularization), or the difference $S_i$=pTrigger[Bin]−pTriggerMedian.

The preferred embodiment is, however, the described dynamic threshold per bin based on the expected value expValue(i) and the standard deviation sdtev(i) since only in this case are both the reduction of the available avalanche photodiodes $F_i$ and the adaptation of the statistical fluctuations associated therewith correctly taken into account.

The statistical relevance sigmaPrefactor can still in particular be made dependent on whether an object has previously been detected or not with a switching sensor 10 that therefore changes a binary switched state depending on whether an object is detected in a specific distance range or not. This corresponds to a switching hysteresis that provides a robust switching behavior. Instead of the uniform sigmaPrefactor, a SIGMA-OFF-TO-ON or SIGMA-ON-TO-OFF is therefore used depending on the current status ON="object detected" or OFF="no object detected". Typical values are SIGMA-OFF-TO-ON of approximately 12 and SIGMA-ON-TO-OFF of approximately 6. The hysteresis has to be directly related to $S_i$ without sigmaPrefactor for the further described embodiments $S_i$.

It has already been mentioned multiple times that the maximum of the measurement events can be close to a boundary between two bins. Two or more adjacent bins are therefore evaluated together in a preferred embodiment. The measured individual times of flight of the bins observed together are then added for the comparison. In addition pTriggerMedian is replaced with the value 2*pTriggerMedian−pTriggerMedian*pTriggerMedian or, in a rougher approximation, simply with 2*pTriggerMedian. The latter values apply to two adjacent bins and have to be modified accordingly for more bins evaluated together. In another respect, the mean value can be calculated very simply over a plurality of bins as a weighted mean from the respective parameters $N_i$ and $m_i$ of the individual bins. The mean value is therefore then also available for a possible downstream more accurate evaluation when adjacent bins are evaluated together.

The background has previously been discussed mainly within the framework of a Bernoulli model. The determination of a measured value is, however, also possible without an observation of the Bernoulli model, for example by comparison with the exponential background. A possible embodiment here is the use of the time constant decayBackground and of the values $F_i$. Here $F_i$ not only comprises the background, but rather also potential measurement events and is in another respect defined in an analog manner to above. When taking account of two adjacent segments, quality criteria are, for example, obtained by means of the parameters $S(i)$=−(2 decayBackground+log($F_{i+1}/F_{i-1}$)) or $S(i)$=−(2 decayBackground++log($F_{i+1}/F_{i-1}$))/(2 decayBackground+Regularization). The factor 2 before decayBackground corresponds to the width of the range that is taken into account, said width being recovered as the difference of the indices i+1 and i−1. If $S_i$ exceeds the threshold $S_D$, an object has been detected in the environment of the bin i and the measured value has thus been fixed. The threshold here is preferably to be designed with a hysteresis corresponding to the previous detection state.

The parameters S(i) here do not take account of the increase in the statistical fluctuation on the quotient $F_{i+1}/F_{i-1}$ with $F_i$ becoming smaller. A characterization that includes the change of the statistical fluctuations as a consequence of the change of $F_i$ such as the above-described Bernoulli model is therefore preferred, but is, as just described, not the only possibility.

The invention claimed is:

1. An optoelectronic sensor for measuring the distance from an object in a monitored zone, the optoelectronic sensor comprising:
    a light transmitter for transmitting individual light signals into the monitored zone;
    a light receiver having at least one avalanche photodiode operated in Geiger mode for receiving individual light pulses reflected or remitted by the object;
    an individual time of flight measurement unit for determining an individual time of flight of a respective one of the individual light pulses as a duration between a transmitted point in time of the respective one of the individual light pulses and a received point in time at the at least one avalanche photodiode thereof; and
    an evaluation unit configured to determine a common measured value for the distance from a plurality of individual times of flight,
    wherein the evaluation unit is further configured to estimate how many of the individual times of flight are to be expected in a time interval on the basis of background events, with an exponentially decaying frequency of background events being assumed, and to determine the common measured value from a time interval in which there are significantly more individual times of flight than expected, and
    wherein the evaluation unit is further configured to determine parameters for describing the exponentially decaying frequency of the background events for a plurality of time intervals, to determine a quantile of these parameters, and to base further estimation of a frequency of the background events on the respective one of the parameters corresponding to this quantile.

2. The sensor in accordance with claim 1,
    wherein the evaluation unit is configured to divide a measurement period following the transmission of an individual light pulse into time intervals.

3. The sensor in accordance with claim 1,
    wherein the evaluation unit is configured to estimate the expected number of individual times of flight in a time interval using a Bernoulli model into which the maximum number of possible individual times of flight in the time interval and a background probability are entered that an individual time of flight is disposed in the time interval due to a background event.

4. The sensor in accordance with claim 3,
    wherein the evaluation unit is configured also to calculate a standard deviation from the Bernoulli model and thus to evaluate whether there are significantly more individual times of flight in a time interval than expected.

5. The sensor in accordance with claim 4,
wherein the evaluation has a hysteresis that requires greater significance when significantly more individual times of flight were not previously found in a time interval and significantly more individual times of flight should now be found than for the opposite case.

6. The sensor in accordance with claim 3,
wherein the evaluation unit is configured to evaluate whether significantly more individual times of flight are present in a time interval than expected by a comparison of the number of measured individual times of flight in a time interval with the number of individual times of flight in a time interval expected from the Bernoulli model.

7. The sensor in accordance with claim 6,
wherein the evaluation has a hysteresis that requires greater significance when significantly more individual times of flight were not previously found in a time interval and significantly more individual times of flight should now be found than for the opposite case.

8. The sensor in accordance with claim 1,
wherein the evaluation unit is configured to evaluate at least two adjacent time intervals together for a taking into account of objects at a distance close to the border of the time interval.

9. The sensor in accordance with claim 1,
wherein the evaluation unit is configured to transmit individual light pulses with a delay to exclude their reception for an initial phase and thus to estimate how many individual times of flight are to be expected on the basis of background events in a time interval.

10. The sensor in accordance with claim 1,
wherein the evaluation unit is configured to determine a median of these parameters.

11. The sensor in accordance with claim 1,
wherein the parameters in a time interval are determined from a quotient of the measured individual times of flight in the time interval to the maximum number of possible individual times of flight in the time interval.

12. The sensor in accordance with claim 1,
wherein the light receiver has a plurality of avalanche photodiodes operated in Geiger mode and a plurality of individual time of flight measurement units that are associated with the avalanche photodiodes individually or in groups.

13. The sensor in accordance with claim 12, wherein the plurality of individual time of flight measurement units have at least one TDC.

14. The sensor in accordance with claim 1,
wherein the evaluation unit is configured to determine a mean value of the individual times of flight in the respective time interval for at least some time intervals.

15. The sensor in accordance with claim 1,
wherein the evaluation unit is configured to determine the common measured value with increasingly finer resolution recursively by refining time intervals in which there are significantly more individual times of flight than expected.

16. A method of measuring the distance from an object in a monitored zone, the method comprising the steps of:
transmitting individual light pulses into the monitored zone;
receiving the individual light pulses reflected or remitted by the object by at least one avalanche photodiode of a light receiver operated in a Geiger mode;
measuring individual times of flight as respective durations between a transmitted point in time of a respective one of the individual light pulses and a received point in time at the avalanche photodiode thereof;
determining a common measured value for a distance from a plurality of individual times of flight;
estimating how many of the individual times of flight are to be expected in a time interval on the basis of background events, with an exponentially decaying frequency of the background events being assumed and with the common measured value being determined from a time interval in which there are significantly more individual times of flight than expected; and
determining parameters for describing the exponentially decaying frequency of the background events for a plurality of time intervals, to determine a quantile of these parameters, and to base further estimation of a frequency of the background events on the respective one of the parameters corresponding to this quantile.

* * * * *